(12) United States Patent
Koopmans et al.

(10) Patent No.: US 9,427,938 B2
(45) Date of Patent: Aug. 30, 2016

(54) MULTI-LAYERED STRUCTURE AND A METHOD OF SEALING OR SHAPING USING A MULTI-LAYERED STRUCTURE

(71) Applicant: Dow Global Technologies LLC, Midland, MI (US)

(72) Inventors: Rudolf J. Koopmans, Einsiedeln (CH); Luis G. Zalamea Bustillo, Richterswil (CH); Karl Zuercher, Samstagern (CH); Thomas T. Allgeuer, Wollerau (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/648,252

(22) PCT Filed: Nov. 19, 2013

(86) PCT No.: PCT/US2013/070718
§ 371 (c)(1),
(2) Date: May 28, 2015

(87) PCT Pub. No.: WO2014/099219
PCT Pub. Date: Jun. 26, 2014

(65) Prior Publication Data
US 2015/0328861 A1    Nov. 19, 2015

Related U.S. Application Data

(60) Provisional application No. 61/737,936, filed on Dec. 17, 2012.

(51) Int. Cl.
```
B32B 7/02      (2006.01)
B32B 5/18      (2006.01)
B32B 7/12      (2006.01)
B32B 27/06     (2006.01)
B32B 7/14      (2006.01)
C09J 7/02      (2006.01)
B32B 27/32     (2006.01)
C08K 9/02      (2006.01)
C08L 23/04     (2006.01)
C09K 3/10      (2006.01)
```

(52) U.S. Cl.
CPC . *B32B 7/02* (2013.01); *B32B 5/18* (2013.01); *B32B 7/12* (2013.01); *B32B 7/14* (2013.01); *B32B 27/065* (2013.01); *B32B 27/32* (2013.01); *C08K 9/02* (2013.01); *C09J 7/0242* (2013.01); *C09J 7/0275* (2013.01); *B32B 2250/242* (2013.01); *B32B 2255/10* (2013.01); *B32B 2255/26* (2013.01); *B32B 2266/0214* (2013.01); *B32B 2307/304* (2013.01); *B32B 2553/00* (2013.01); *C08K 2201/01* (2013.01); *C08L 23/04* (2013.01); *C09J 2423/046* (2013.01); *C09K 3/1006* (2013.01); *Y10T 428/24802* (2015.01); *Y10T 428/24942* (2015.01)

(58) Field of Classification Search
CPC ........... C08K 9/02; C08L 23/04; H01F 1/36; H01F 1/26
See application file for complete search history.

(56) References Cited

U.S. PATENT DOCUMENTS

| | | | |
|---|---|---|---|
| 3,645,992 | A | 2/1972 | Elston |
| 4,076,698 | A | 2/1978 | Anderson et al. |
| 5,272,236 | A | 12/1993 | Lai et al. |
| 5,278,272 | A | 1/1994 | Lai et al. |
| 5,504,172 | A | 4/1996 | Imuta et al. |
| 5,677,383 | A | 10/1997 | Chum et al. |
| 5,844,045 | A | 12/1998 | Kolthammer et al. |
| 5,869,575 | A | 2/1999 | Kolthammer et al. |
| 6,111,023 | A | 8/2000 | Chum et al. |
| 6,316,549 | B1 | 11/2001 | Chum et al. |
| 6,448,341 | B1 | 9/2002 | Kolthammer et al. |
| 6,538,070 | B1 | 3/2003 | Cardwell et al. |
| 6,566,446 | B1 | 5/2003 | Parikh et al. |
| 6,960,635 | B2 | 11/2005 | Stevens et al. |
| 7,608,668 | B2 | 10/2009 | Li Pi Shan et al. |
| 2012/0080637 | A1* | 4/2012 | Herzog ............... C08K 9/02 252/62.54 |
| 2015/0328861 | A1* | 11/2015 | Koopmans ............ C08K 9/02 428/195.1 |

FOREIGN PATENT DOCUMENTS

| | | |
|---|---|---|
| CN | 101923932 | 12/2010 |
| CN | 101966344 | 2/2011 |
| CN | 102091575 | 6/2011 |
| CN | 102336972 | 2/2012 |
| CN | 102360659 | 2/2012 |
| WO | 0001745 | 1/2000 |
| WO | 0185831 | 11/2001 |
| WO | 2005090427 | 9/2005 |
| WO | 2009067337 | 5/2009 |
| WO | 2010149443 | 12/2010 |

OTHER PUBLICATIONS

EP Response to Office Action dated Jan. 7, 2016; from EP counterpart Application No. 13796228.8.
PCT/US2013/070718 International Search Report and Written Opinion dated Jan. 27, 2014, 9 pages.
PCT/US2013/070718 International Preliminary Report On Patentability dated Jul. 2, 2015, 7 pages.
EPO Office Action dated Jul. 24, 2015 for counterpart European Application No. 13796228.8, 2 pages.

* cited by examiner

*Primary Examiner* — Betelhem Shewareged

(57) ABSTRACT

A multi-layered structure comprising an induction activation layer comprising a blend of (a) a first thermoplastic polymer, (b) a plurality of first particles, each said first particle comprising (i) a core comprising one or more magnetic materials and (ii) a shell comprising silicon dioxide; and (c) optionally a plurality of second particles, each said second particle comprising heat conducting particles; and a sealant, wherein the sealant exhibits a melting point equal to or lower than any other layer in the multi-layered structure, wherein the induction activation layer and sealant are in direct or indirect thermal contact is provided.

16 Claims, No Drawings

MULTI-LAYERED STRUCTURE AND A METHOD OF SEALING OR SHAPING USING A MULTI-LAYERED STRUCTURE

FIELD OF INVENTION

The instant invention relates to a multi-layered structure and a method of sealing or shaping using a multi-layered structure.

BACKGROUND OF THE INVENTION

Many converting processes of polymer articles, particularly in the field of packaging, require a secondary heating process for welding, sealing or shaping such articles. The most commonly used process today is heat transfer by conduction (e.g., heated sealing bars) or infrared heating. These processes rely on heat transfer throughout the entire structure. In many instances, such structures contain actual heat barrier materials. For example, the polymer itself generally has very poor thermal conductivity. Currently, in cardboard/polymer laminates, an aluminum foil layer is used as a means of heating via electromagnetic induction. The use of aluminum, or other metal, foils increases the laminate cost and has an undesirable environmental impact.

Therefore, a multi-layered structure allowing efficient heat transfer despite the presence of insulating layers or low heat transfer polymer would be beneficial.

SUMMARY OF THE INVENTION

The instant invention is a multi-layered structure, a method of sealing films, and a method of forming articles.

In one embodiment, the instant invention provides a multi-layered structure comprising an induction activation layer comprising a blend of (a) a first thermoplastic polymer; (b) a plurality of first particles, each said first particle comprising (i) a core comprising one or more magnetic materials and (ii) a shell comprising silicon dioxide; and (c) optionally a plurality of second particles, each said second particle comprising heat conducting particles; and a sealant, wherein the sealant exhibits a melting point equal to or lower than any other layer in the multi-layered structure; wherein the induction activation layer and sealant are in direct or indirect thermal contact.

DETAILED DESCRIPTION OF THE INVENTION

The instant invention is a multi-layered structure and method of sealing or forming an article having a multi-layered structure.

As used herein, "ethylene-based polymer" includes polyethylene homopolymers, ethylene copolymerized with one or more copolymers, e.g., one or more α-olefin copolymers, and combinations thereof.

As used herein, "propylene-based polymer" includes polypropylene homopolymers, propylene copolymerized with one or more copolymers, e.g., one or more α-olefin copolymers, and combinations thereof.

As used herein, "heat conducting particles" includes any metallic or non-metallic particles which have a thermal conductivity of equal to or greater than 0.5 W/mK.

As used herein, "poor thermal conductivity" means having a thermal conductivity of less than 0.5 W/mK.

The First Multi-Layered Structure and Method of Sealing a Film

The first multi-layered structure according to the present invention comprises an induction activation layer comprising a blend of (a) a first thermoplastic polymer; (b) a plurality of first particles, each said first particle comprising (i) a core comprising one or more magnetic materials and (ii) a shell comprising silicon dioxide; and (c) optionally a plurality of second particles, each said second particle comprising heat conducting particles; and a sealant, wherein the sealant exhibits a melting point equal to or lower than any other layer in the multi-layered structure; wherein the induction activation layer and sealant are in direct or indirect thermal contact.

In yet another embodiment, the present invention provides a method of sealing a film comprising selecting a film which comprises an induction activation layer comprising a blend of (a) a first thermoplastic polymer; and (b) a plurality of particles, each said particle comprising (i) a core comprising one or more magnetic materials and (ii) a shell comprising silicon dioxide, and a sealant, wherein the sealant is in thermal contact with the induction activation layer; and exposing the induction activation layer to a magnetic field.

In an alternative embodiment, the instant invention provides a first multi-layered structure and a method of sealing a film, in accordance with any of the embodiments disclosed herein, except that the induction activation layer comprises at least 2 percent by weight of a plurality of first particles. All individual values and subranges from at least 2 percent by weight are included herein and disclosed herein; for example, the amount of the plurality of first particles can be from a lower limit of 2, 4, 6, 8, 10, 15, or 20 percent by weight.

In an alternative embodiment, the instant invention provides a first multi-layered structure and a method of sealing a film, in accordance with any of the embodiments disclosed herein, except that the multi-layered structure or film further comprises a poor thermal conductivity layer. The poor thermal conductivity layer may be made from any material having a thermal conductivity of less than 0.5 W/mK.

Exemplary poor thermal conductivity materials include thermoplastic polymer foams, cellulosic materials, such as cardboard, polymer composite materials, silica aerogels, epoxy, polyurethane, closed cell polyurethane spray foam, polyisocyanurate spray foam, phenolic spray foam, urea foam, extruded expanded polystyrene, polystyrene, fiberglass, cotton, rock and slag wool, straw, vermiculite, wood or wood fibers, cementitious foam and any combination of two or more thereof.

In an alternative embodiment, the instant invention provides a first multi-layered structure and a method of sealing a film, in accordance with any of the embodiments disclosed herein, except that the first thermoplastic polymer comprises an ethylene-based polymer.

In an alternative embodiment, the instant invention provides a first multi-layered structure and a method of sealing a film, in accordance with any of the embodiments disclosed herein, except that the first thermoplastic polymer comprises an ethylene-based exhibits at least one of the following properties: (a) a melt index, $I_2$, of from 0.8 to 8 g/10 minutes, (b) a density of 0.915 to 0.935 g/cm$^3$, All individual values and subranges from 0.8 to 8 g/10 minutes (g/10 min) are included herein and disclosed herein; for example, the $I_2$ may range from a lower limit of 0.8, 1.8, 2.8, 3.8, 4.8, 5.8, 6.8, or 7.8 g/10 min to an upper limit of 1, 2,3, 4, 5, 6, 7, or 8 g/10 min. For example, in particular embodiments, the $I_2$ may range from 0.8 to 8 g/10 min, or in the alternative, the $I_2$ may range from 0.8 to 4 g/10 min, or in the alternative, the $I_2$ may range from 4 to 8 g/10 min, or in the alternative, the $I_2$ may range from 2 to 6 g/10 min. All individual values and subranges from 0.915 to 0.935 g/cm$^3$ are include herein and disclosed herein; for example, the density may range from a lower limit of 0.915, 0.92, 0.925 or 0.93 to an upper limit of 0.92, 0.925, 0.93 or 0.935 g/cm$^3$. For example, in particular embodiments, the density of the first thermoplastic polymer may range from 0.915 to 0.935 g/cm$^3$, or in the alternative, the density of the first thermoplastic polymer may range from 0.915 to 0.925 g/cm$^3$, or in the alternative, the density of the first thermoplastic polymer may range from 0.925 to 0.935 g/cm$^3$, or in the alternative, the density of the first thermoplastic polymer may range from 0.92 to 0.93 g/cm$^3$.

In an alternative embodiment, the instant invention provides a first multi-layered structure and a method of sealing a film, in accordance with any of the embodiments disclosed herein, except that the sealant is coextruded with the induction activation layer.

In an alternative embodiment, the instant invention provides a first multi-layered structure and a method of sealing a film, in accordance with any of the embodiments disclosed herein, except that the induction activation layer is extruded and the sealant is disposed onto the induction activation layer following extrusion of the induction activation layer.

In an alternative embodiment, the instant invention provides a first multi-layered structure and a method of sealing a film, in accordance with any of the embodiments disclosed herein, except that the sealant is disposed onto the induction activation layer either continuously or discontinuously.

Conventional thermoplastic film conversion processes such as cast, blown, extrusion coating, extrusion lamination, and coextrusions or combinations of all of them are encompassed by the present invention.

The Second Multi-Layered Structure and Method of Forming an Article

The second multi-layered structure according to the present invention comprises a sealant comprising a blend of (a) a second thermoplastic polymer which has a melting point of equal to or less than that of any other layer in the multi-layered structure; (b) a plurality of first particles, each said first particle comprising (i) a core comprising one or more magnetic materials and (ii) a shell comprising silicon dioxide; and (c) optionally a plurality of second particles, each said second particle comprising heat conducting particles.

In yet another embodiment, the present invention provides a method of forming an article comprising selecting a sealant which comprises a blend of (a) a second thermoplastic polymer; and (b) a plurality of particles, each said particle comprising (i) a core comprising one or more magnetic materials and (ii) a shell comprising silicon dioxide, forming an article from a structural polymer; disposing the sealant on at least a portion of the article; and subjecting the sealant to a magnetic field.

In an alternative embodiment, the instant invention provides a second multi-layered structure and a method of forming an article, in accordance with any of the embodiments disclosed herein, except that the sealant comprises at least 2 percent by weight of a plurality of first particles. All individual values and subranges from at least 2 percent by weight are included herein and disclosed herein; for example, the amount of the plurality of first particles can be from a lower limit of 2, 4, 6, 8, 10, 15, or 20 percent by weight.

In an alternative embodiment, the instant invention provides a second multi-layered structure, in accordance with any of the embodiments disclosed herein, except that the second multi-layered structure further comprises a structural layer and the sealant is disposed on the structural layer.

In an alternative embodiment, the instant invention provides a second multi-layered structure, in accordance with any of the embodiments disclosed herein, except that the sealant is coextruded with the structural layer.

In an alternative embodiment, the instant invention provides a second multi-layered structure, in accordance with any of the embodiments disclosed herein, except that the structural layer is extruded and the sealant is disposed onto a surface of the structural layer following extrusion.

In an alternative embodiment, the instant invention provides a second multi-layered structure, in accordance with any of the embodiments disclosed herein, except that the sealant layer is disposed continuously or discontinuously on the structural layer.

In an alternative embodiment, the instant invention provides a second multi-layered structure, in accordance with any of the embodiments disclosed herein, except that the second multi-layered structure further comprises a poor thermal conductive layer.

In an alternative embodiment, the instant invention provides a second multi-layered structure, in accordance with any of the embodiments disclosed herein, except that the poor thermal conductive layer comprises a thermoplastic polymer foam.

In an alternative embodiment, the instant invention provides a second multi-layered structure, in accordance with any of the embodiments disclosed herein, except that the poor thermal conductive layer comprises a cellulosic material. In a particular embodiment, the thermal conductivity of the cellulosic material is controlled by the water content, or humidity, of the cellulosic material.

The second thermoplastic polymer may be any polymer which has a melting point lower than the melting point of any other component of the multi-layered structure.

In an alternative embodiment, the instant invention provides a second multi-layered structure and method of forming an article, in accordance with any of the embodiments disclosed herein, the second thermoplastic polymer is selected from the group consisting of ethylene-based polymers.

In an alternative embodiment, the instant invention provides a second multi-layered structure and method of forming an article, except that the second thermoplastic polymer comprises a polyethylene which exhibits at least one of the following properties: ((a) a melt index, $I_2$, of from 0.8 to 8 g/10 minutes, (b) a density of 0.915 to 0.935 g/cm$^3$, All individual values and subranges from 0.8 to 8 g/10 minutes (g/10 min) are included herein and disclosed herein; for example, the $I_2$ may range from a lower limit of 0.8, 1.8, 2.8, 3.8, 4.8, 5.8, 6.8, or 7.8 g/10 min to an upper limit of 1, 2, 3, 4, 5, 6, 7, or 8 g/10 min. For example, in particular embodiments, the $I_2$ may range from 0.8 to 8 g/10 min, or in the alternative, the $I_2$ may range from 0.8 to 4 g/10 min, or in the alternative, the $I_2$ may range from 4 to 8 g/10 min, or in the alternative, the $I_2$ may range from 2 to 6 g/10 min. All individual values and subranges from 0.915 to 0.935 g/cm$^3$ are include herein and disclosed herein; for example, the density may range from a lower limit of 0.915, 0.92, 0.925 or 0.93 to an upper limit of 0.92, 0.925, 0.93 or 0.935 g/cm$^3$. For example, in particular embodiments, the density of the first thermoplastic polymer may range from 0.915 to 0.935 g/cm$^3$, or in the alternative, the density of the first thermoplastic polymer may range from 0.915 to 0.925 g/cm$^3$, or in the alternative, the density of the first thermoplastic polymer may range from 0.925 to 0.935 g/cm³, or in the alternative, the density of the first thermoplastic polymer may range from 0.92 to 0.93 g/cm³.

In an alternative embodiment, the instant invention provides a second multi-layered structure and method of forming an article, except that the second thermoplastic polymer is an ethylene-based polymer having a density from 0.90 to 0.945 g/cm³.

In an alternative embodiment, the instant invention provides a second multi-layered structure and method of forming an article, except that the second thermoplastic polymer is an ethylene-based polymer having an $I_2$ from 0.01 to 15 g/10 min.

Any conventional process for forming an article from a thermoplastic polymer are included herein and disclosed herein. For example, articles may be formed by molding, extruding, calendaring, laminating or any combination thereof.

Plurality of First Particles

As used herein, the term "magnetic" refers to materials which are magnetic in the absence of any electromagnetic field and those which become magnetic in the presence of an electric field and includes ferromagnetic, diamagnetic and paramagnetic materials, as well as combinations thereof.

In an alternative embodiment, the instant invention provides a first multi-layered structure, a second multi-layered structure, a method for sealing a film and a method for forming an article in accordance with any of the embodiments disclosed herein, except that the core material is selected from the group consisting of Fe, Co and Ni; oxides of Fe, Co and/or Ni, such as $Fe_3O_4$ and gamma-$Fe_2O_3$; spinel-type ferromagnetic materials such as $MgFe_2O_4$, $MnFe_2O_4$ and $CoFe_2O_4$; alloys, such as $CoPt_3$ and FePt; and combinations of two or more thereof.

In an alternative embodiment, the instant invention provides a first multi-layered structure, a second multi-layered structure, a method for sealing a film and a method for forming an article in accordance with any of the embodiments disclosed herein, except that the core material comprises one or more iron oxides selected from the group consisting of haematite, magnetite and maghemite, or a mixture of two or three of these iron oxides.

In an alternative embodiment, the instant invention provides a first multi-layered structure, a second multi-layered structure, a method for sealing a film and a method for forming an article in accordance with any of the embodiments disclosed herein, except that the core material consists essentially of one or more iron oxides selected from the group consisting of haematite, magnetite and maghemite, or a mixture of two or three of these iron oxides.

The proportions of core material and of shell material within the core/shell structure can vary within wide limits as a function of core material, of the thickness of the shell, and of the structure of the particles, isolated or aggregated. The proportions of the core material and of the shell material are generally in each case from 10 to 90% by weight.

All individual values and subranges from 10 to 90 wt % are included herein and disclosed herein; for example, the amount of core in the core/shell structure can be from a lower limit of 10, 20, 30, 40, 50, 60, 70, 80, or 89 wt % to an upper limit of 15, 25, 35, 45, 55, 65, 75, 85 or 90 wt %. For example, the amount of the core in the core/shell structure may be in the range of from 10 to 90 wt %, or in the alternative, the amount of the core in the core/shell structure may be in the range of from 50 to 90 wt %, or in the alternative, the amount of the core in the core/shell structure may be in the range of from 50 to 80 wt %, or in the alternative, the amount of the core in the core/shell structure may be in the range of from 75 to 85 wt %.

Likewise, all individual values and subranges from 10 to 90 wt % with respect to the amount of shell in the core/shell structure are included herein and disclosed herein; for example, the amount of shell in the core/shell structure can be from a lower limit of 10, 20, 30, 40, 50, 60, 70, 80, or 89 wt % to an upper limit of 15, 25, 35, 45, 55, 65, 75, 85 or 90 wt %. For example, the amount of the shell in the core/shell structure may be in the range of from 10 to 90 wt %, or in the alternative, the amount of the shell in the core/shell structure may be in the range of from 10 to 50 wt %, or in the alternative, the amount of the shell in the core/shell structure may be in the range of from 30 to 50 wt %, or in the alternative, the amount of the core in the core/shell structure may be in the range of from 15 to 25 wt %.

In an alternative embodiment, the instant invention provides a first multi-layered structure, a second multi-layered structure, a method for sealing a film and a method for forming an article in accordance with any of the embodiments disclosed herein, except that each particle of the plurality of first particles comprises from 50 to 90% by weight core and from 10 to 50% by weight shell.

In an alternative embodiment, the instant invention provides a method for sealing a film and a method for forming an article in accordance with any of the embodiments disclosed herein, except that the magnetic field has a frequency in the range of from 80 kHz to 30 MHz.

In an alternative embodiment, the instant invention provides a method for sealing a film and a method for forming an article in accordance with any of the embodiments disclosed herein, except that the magnetic field has a frequency in the range of from 250 kHz to 2 MHz. All individual values and subranges from 250 kHz to 2 MHz is included herein and disclosed herein; for example, the frequency of the magnetic field may have a lower limit of 250, 350, 450, 550, 650, 750, 850, 950, 1050, 1150, 1250, 1350, 1450, 1550, 1650, 1750, 1850, or 1950 kHz to an upper limit of 300, 400, 500, 600, 700, 800, 900, 1000, 1100, 1200, 1300, 1400, 1500, 1600, 1700, 1800, 1900, or 2000 kHz. For example, the frequency of the magnetic field may be in the range of from 250 kHz to 2 MHz, or in the alternative, the frequency of the magnetic field may be in the range of from 350 kHz to 1 MHz, or in the alternative, the frequency of the magnetic field may be in the range of from 400 kHz to 700 kHz, or in the alternative, the frequency of the magnetic field may be in the range of from 440 kHz to 600 kHz.

First and Second Thermoplastic Polymers

The first thermoplastic polymer may be any thermoplastic polymer suitable for use in a multi-layered structure provided that the sealant has a melting point equal to or lower than the melting point of any other layer in the multi-layer structure, including the induction activation layer.

The second thermoplastic polymer may be any thermoplastic suitable for use in a sealant provided that the second thermoplastic polymer has a melting point of equal to or less than that of any other layer in the multi-layered structure.

Thermoplastic polymers include those made from a wide range of monomer units. For example, thermoplastic polymers include, without limitation, polypropylene, high density polyethylene, low density polyethylene, polystyrenes, polyamides, polyalkylmethacrylates, polyalkylacrylates, polyphenylenes, polycarbonates, and polyvinylchlorides.

In selected embodiments, the first and second thermoplastic polymer are formed from ethylene-α-olefin copolymers or propylene-α-olefin copolymers. In particular, in preferred embodiments, the first and second thermoplastic polymer comprises one or more non-polar polyolefins. In yet another embodiment, the first and/or second thermoplastic polymers are a blend of one or more ethylene-based polymers and propylene-based polymers.

In one particular embodiment, the first and second thermoplastic polymer is a propylene/α-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/α-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, or 0.5 g/10 minutes to an upper limit of 25 g/10 minutes, 15 g/10 minutes, 10 g/10 minutes, 8 g/10 minutes, or 5 g/10 minutes. For example, the propylene/α-olefin copolymer may have a melt flow rate in the range of 0.1 to 10 g/10 minutes; or in the alternative, the propylene/α-olefin copolymer may have a melt flow rate in the range of 0.2 to 10 g/10 minutes.

The propylene/α-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/α-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/α-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method, as described above. The propylene/α-olefin copolymer comprises units derived from propylene and polymeric units derived from one or more α-olefin comonomers. Exemplary comonomers utilized to manufacture the propylene/α-olefin copolymer are C2, and C4 to C10 α-olefins; for example, C2, C4, C6 and C8 α-olefins.

The propylene/α-olefin copolymer comprises from 1 to 40 percent by weight of one or more α-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/α-olefin copolymer comprises from 1 to 35 percent by weight of one or more α-olefin comonomers; or in the alternative, the propylene/α-olefin copolymer comprises from 1 to 30 percent by weight of one or more α-comonomers; or in the alternative, the propylene/α-olefin copolymer comprises from 3 to 27 percent by weight of one or more α-olefin comonomers; or in the alternative, the propylene/α-olefin copolymer comprises from 3 to 20 percent by weight of one or more α-olefin comonomers; or in the alternative, the propylene/α-olefin copolymer comprises from 3 to 15 percent by weight of one or more α-olefin comonomers.

The propylene/α-olefin copolymer has a molecular weight distribution (MWD), defined as weight average molecular weight divided by number average molecular weight (Mw/Mn) of 3.5 or less; in the alternative 3.0 or less; or in another alternative from 1.8 to 3.0.

Such propylene/α-olefin copolymers are further described in details in the U.S. Pat. Nos. 6,960,635 and 6,525,157, incorporated herein by reference. Such propylene/α-olefin copolymers are commercially available from The Dow Chemical Company, under the tradename VERSIFY or from ExxonMobil Chemical Company, under the tradename VISTAMAXX. In one embodiment, the propylene/α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a C4-10 α-olefin; and containing an average of at least 0.001, preferably an average of at least 0.005 and more preferably an average of at least 0.01, long chain branches/1000 total carbons. The maximum number of long chain branches in the propylene interpolymer is not critical to the definition of this invention, but typically it does not exceed 3 long chain branches/1000 total carbons. The term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/α-olefin copolymers are further described in details in the U.S. Provisional Patent Application No. 60/988,999 and International Paten Application No. PCT/US08/082599, each of which is incorporated herein by reference.

In other selected embodiments, olefin block copolymers, for example, ethylene multi-block copolymer, such as those described in the International Publication No. WO2005/090427 and U.S. patent application Ser. No. 11/376,835 may be used as the first and second thermoplastic polymer.

In alternative embodiments, polyolefins such as polypropylene, polyethylene, and copolymers thereof, and blends thereof, as well as ethylene-propylene-diene terpolymers, may be used as the first and second thermoplastic polymer. In some embodiments, exemplary olefinic polymers include, but are not limited to, homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/α-olefin copolymers; homogeneously branched, substantially linear ethylene/α-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may be also be used as the first and second thermoplastic polymer. Of course, blends of polymers can be used as well. In some embodiments, the blends of first and second thermoplastic polymer s include two different Ziegler-Natta polymers. In other embodiments, the blends of first and second thermoplastic polymer s can include blends of a Ziegler-Natta and a metallocene polymer. In still other embodiments, the first and second thermoplastic polymer may be a blend of two different metallocene polymers. In other embodiments polymers produced from single site catalysts may be used. In yet another embodiment, block or multi-block copolymers may be used. Such polymers include those described and claimed in WO2005/090427 (having priority to U.S. Ser. No. 60/553,906, filed Mar. 7, 2004).

In some particular embodiments, the first and second thermoplastic polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the first and second thermoplastic polymer may be ethylene vinyl acetate (EVA) based polymers. In other embodiments, the first and second thermoplastic polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In certain embodiments, the first and second thermoplastic polymer can be an ethylene-octene copolymer or interpolymer having a density between 0.863 and 0.911 g/cc and melt index (190° C. with 2.16 kg weight) from 0.1 to 1200 g/10 min, or in the alternative, from 0.1 to 1000 g/10 min, and in another alternative, 0.1 to 100 g/10 min. In other embodiments, the ethylene-octene copolymers may have a density between 0.863 and 0.902 g/cm$^3$ and melt index (measured at 190° C. under a load of 2.16 kg) from 0.8 to 35 g/10 min.

In certain embodiments, the first and second thermoplastic polymer can be propylene-ethylene copolymer or interpolymer having an ethylene content between 5 and 20 percent by weight and a melt flow rate (measured at 230° C. under a load of 2.16 kg) from 0.5 to 300 g/10 min. In other embodiments, the propylene-ethylene copolymer or interpolymer may have an ethylene content between 9 and 12 percent by weight and a melt flow rate (measured at 230° C. under a load of 2.16 kg) from 1 to 100 g/10 min.

In certain other embodiments, the first and/or second thermoplastic polymer can be a low density polyethylene having a density between 0.911 and 0.925 g/cm$^3$ and melt index (measured at 190° C. under a load of 2.16 kg) from 0.1 to 100 g/10 min.

In another embodiment, the first and/or second thermoplastic polymer has a density from 0.860 to 0.940 g/cm$^3$. All individual values and subranges from 0.860 to 0.940 g/cm$^3$ are included herein and disclosed herein. For example, the density can be from a lower limit of 0.86, 0.87, 0.88, 0.89, 0.9, 0.91, 0.92 or 0.93 g/cm$^3$ to an upper limit of 0.87, 0.88, 0.89, 0.9, 0.91, 0.92, 0.93, or 0.94 g/cm$^3$.

In other embodiments, the first and/or second thermoplastic polymer can have a crystallinity of less than 50 percent. For example, the crystallinity of the first and second thermoplastic polymer may be from 5 to 35 percent; or in the alternative, the crystallinity can range from 7 to 20 percent.

In certain other embodiments, the first and/or second thermoplastic polymer can have a melting point of less than 110° C. For example, the melting point may be from 25 to 100° C.; or in the alternative, the melting point may be between 40 and 85° C.

In certain embodiments, the first and second thermoplastic polymer can have a weight average molecular weight greater than 20,000 g/mole. For example, the weight average molecular weight may be from 20,000 to 150,000 g/mole; or in the alternative, from 50,000 to 100,000 g/mole.

The one or more first and second thermoplastic polymer s, for example, thermoplastic resins, may be contained within the aqueous dispersion in an amount from 1 percent by weight to 96 percent by weight. For instance, the one or more first and second thermoplastic polymer s, for example, thermoplastic resins, may be present in the aqueous dispersion in an amount from 10 percent by weight to 70 percent by weight, such as from 20 percent to 50 percent by weight.

The present invention may be embodied in other forms without departing from the spirit and the essential attributes thereof, and, accordingly, reference should be made to the appended claims, rather than to the foregoing specification, as indicating the scope of the invention.

We claim:

1. A multi-layered structure comprising:
    an induction activation layer comprising a blend of
        (a) a first thermoplastic polymer;
        (b) a plurality of first particles, each said first particle comprising
            (i) a core comprising one or more magnetic materials and (ii) a shell comprising silicon dioxide; and
(c) optionally a plurality of second particles, each said second particle comprising heat conducting particles; and
a sealant, wherein the sealant exhibits a melting point equal to or lower than any other layer in the multi-layered structure; and
a poor thermal conductive layer which comprises a thermoplastic polymer foam;
wherein the induction activation layer and sealant are in direct or indirect thermal contact.

2. The multi-layered structure according to claim 1, wherein the induction activation layer comprises at least 2 percent by weight of a plurality of first particles.

3. The multi-layered structure according to claim 1, wherein the poor thermal conductivity layer comprises a cellulosic material.

4. The multi-layered structure according to claim 1, wherein the first thermoplastic polymer comprises an ethylene-based polymer.

5. The multi-layered structure according to claim 4, wherein the ethylene-based polymer exhibits at least one of the following properties: (a) a melt index, $I_2$, of from 0.8 to 8 g/10in, (b) a density of 0.915 to 0.935 $g/cm^3$.

6. The multi-layered structure according to claim 1, wherein the sealant is coextruded with the induction activation layer.

7. The multi-layered structure according to claim 1, wherein the induction activation layer is extruded and the sealant is disposed onto the induction activation layer following extrusion of the induction activation layer.

8. The multi-layered structure according to claim 6, wherein the sealant is disposed onto the induction activation layer either continuously or discontinuously.

9. A multi-layered structure comprising:
a sealant comprising a blend of
(a) a second thermoplastic polymer which has a melting point of equal to or less than that of any other layer in the multi-layered structure;
(b) a plurality of first particles, each said first particle comprising
(i) a core comprising one or more magnetic materials and
(ii) a shell comprising silicon dioxide; and
(c) optionally a plurality of second particles, each said second particle comprising heat conducting particles; and
a poor thermal conductive layer which comprises a thermoplastic polymer foam.

10. The multi-layered structure according to claim 9, wherein the sealant comprises at least 2 percent by weight of the plurality of first particles.

11. The multi-layered structure according to claim 9, further comprising a structural layer wherein the sealant is disposed on the structural layer.

12. The multi-layered structure according to claim 11, wherein the sealant is coextruded with the structural layer.

13. The multi-layered structure according to claim 11, wherein the structural layer is extruded and the sealant is disposed onto a surface of the structural layer following extrusion.

14. The multi-layered structure according to claim 11, wherein the sealant layer is disposed continuously or discontinuously on the structural layer.

15. The multi-layered structure according to claim 9, wherein the poor thermal conductive layer comprises a cellulosic material.

16. The multi-layered structure according to claim 9, wherein the second thermoplastic polymer is selected from the group consisting of ethylene-based polymers.

* * * * *